United States Patent [19]
Schiler

[11] 4,273,448
[45] Jun. 16, 1981

[54] MEASURING METHOD AND APPARATUS

[76] Inventor: Frederick S. Schiler, 3375 Oak Rd., Stow, Ohio 44224

[21] Appl. No.: 44,987

[22] Filed: Jun. 4, 1979

[51] Int. Cl.³ .................... G01B 11/14; G02B 27/60; H01F 21/04
[52] U.S. Cl. .............................. 356/374; 250/237 G; 336/129
[58] Field of Search .............................. 356/373–374, 356/395, 243, 256, 396; 250/237 R, 237 G, 231 SE; 73/494; 324/208; 336/121, 123, 129; 33/125 C, 125 A, 125 T, 494, 483, 450; 350/110–114, 115–116; 318/632–634; 235/70 B, 70 C

[56] References Cited

U.S. PATENT DOCUMENTS

| 1,415,627 | 5/1922 | Giambiasi | 356/395 |
|---|---|---|---|
| 2,416,968 | 3/1947 | Turrettini . | |
| 2,451,972 | 10/1948 | Powers | 356/395 |
| 2,799,835 | 7/1957 | Tripp et al. . | |
| 2,867,783 | 1/1959 | Childs | 336/123 |
| 2,886,717 | 5/1959 | Williamson et al. . | |
| 2,886,718 | 5/1959 | Shepherd et al. . | |
| 2,915,722 | 12/1959 | Foster | 336/129 |
| 2,924,798 | 2/1960 | Foster | 336/129 |
| 3,064,218 | 11/1962 | Farrand | 336/129 |
| 3,090,934 | 5/1963 | Farrand | 336/129 |
| 3,098,186 | 7/1963 | Williamson et al. . | |
| 3,202,948 | 8/1965 | Farrand | 336/129 |
| 3,249,854 | 5/1966 | Nevius | 336/129 |
| 3,394,248 | 7/1968 | Ogden . | |
| 3,582,769 | 6/1971 | Brandenburg | 33/125 C |
| 3,688,570 | 9/1972 | Burke, Jr. . | |
| 3,755,682 | 8/1973 | Russell . | |
| 3,791,742 | 2/1974 | Grey et al. . | |
| 4,047,586 | 9/1977 | Dlugos | 250/237 G |
| 4,074,131 | 2/1978 | Schwebel | 250/237 G |

FOREIGN PATENT DOCUMENTS 805974 12/1958 United Kingdom ...................... 324/208
811669 4/1959 United Kingdom ...................... 324/208

Primary Examiner—John K. Corbin
Assistant Examiner—Wm. H. Punter
Attorney, Agent, or Firm—Reese Taylor

[57] ABSTRACT

This invention relates to method and apparatus for improving the accuracy of optical or electrical position measuring apparatus wherein movement of one object relative to another is measured. One known system employs primary and secondary windings each comprising a multiplicity of series-connected conductors arranged on adjacent faces of relatively movable members of insulating material. In another system an optical Moire fringe pattern is moved in correspondence as regards extent and sense with the movement with the object and the number of fringes displaced from a fiducial line are counted. The improvement is applicable to either system and includes placing a series of parallel lines or parallel conductors on the scale or movable object at an angle with respect to the path of movement of the object and placing another set of parallel lines or parallel conductors on the slider or reader followed by providing for controlled movement of the scale transversely of the path of movement of the object to vary the "count" of the lines or conductors on the scale and those on the slider or reader in order to compensate for machine or scale error and render the resulting operational "counts" accurate with respect to the actual movement of the object. Adjustable scale engaging clips are employed to permit the controlled lateral adjustment of the scales.

7 Claims, 13 Drawing Figures

MEASURING METHOD AND APPARATUS

FIELD OF THE INVENTION

This invention relates in general to precision measuring apparatus and in particular relates to a method and apparatus for improving the accuracy of optical or electrical position measuring apparatus.

DESCRIPTION OF THE PRIOR ART

It is well known in the prior art to provide measuring means to compute or measure the length or degree of linear travel of one object relative to another. By way of example only there are known inspection machines for checking and inspecting precision machined parts. Those inspection machines have scales associated with their various components which measure the linear movement of the machine components in the X,Y and Z axes to facilitate the inspection procedure.

Furthermore, it has also long been known that such movement can be measured even more accurately electronically. This has primarily been accomplished by one of two alternative methods.

One system commonly used employs transformers in the form of primary and secondary windings each comprising a multiplicity of series-connected conductors arranged on opposite faces of the movable object or scale and the slider which overlies the scale. When the conductors of one winding are energized with an alternating voltage, the current in each conductor of that winding induces a voltage in the conductor of the other winding which happens to be adjacent thereto and these voltages add at the terminals of the other winding to give a secondary voltage which varies in magnitude according to the relative position of the movable object and the slider to thus measure the travel.

In this system the conductors are carried on the scale and on the slider which overlies the scale. These conductors are arranged at 90° to the path of travel and a sine wave is created which can be read electronically to measure linear movement.

Another of these methods involves applying a series of parallel lines to the scale and also providing an overlying reading head having a plurality of lines which are at a different angle than the scale lines with respect to the path of movement. When the reading head passes over the scale, an optical Moire Fringe pattern is created and the distance of movement can be read by reading the pulses that are created by photoelectric cells as the lines move across each other. The variance in the electrical energy produces a cycle which is broken down into distance and "count" and then displayed on a digital readout.

The effect involved in this system is generally called a Moire Fringe effect. By definition, when one family of lines is superimposed over another family of lines so that they cross at an angle, a new family of curves appear which pass through the intersections of the original lines. Optically this produces what is often called a shadow line. In any event, the relative linear movement along the machine travel path is then electrically read by reflecting these traveling or moving shadow lines.

Examples of these systems and some of the application of them can be seen in Giambiasi U.S. Pat. No. 1,415,627; Turrettini U.S. Pat. No. 2,416,968; Williamson U.S. Pat. No. 2,886,717; Shepherd U.S. Pat. No. 2,886,718; Williamson U.S. Pat. No. 3,098,186; Ogden U.S. Pat. No. 3,394,248; Burke U.S. Pat. No. 3,688,570; Russell U.S. Pat. No. 3,755,682; Grey U.S. Pat. No. 3,791,742; Schwebel U.S. Pat. No. 4,074,131; Farrand U.S. Pat. No. 3,202,948; Farrand U.S. Pat. No. 3,064,218; Farrand U.S. Pat. No. 3,090,934; Foster U.S. Pat. No. 2,924,978; Foster U.S. Pat. No. 2,915,722; Childs U.S. Pat. No. 2,867,783 and Tripp U.S. Pat. No. 2,799,835.

While all of the measuring systems disclosed in the numerous patents listed above are presumably operative for purposes of measuring travel of one object relative to another, there is a problem in their practical application to various machines such as, for example, the inspection machines discussed above. All machines of this nature contain inaccuracies either in the scales or in the machine geometry itself thereby leading to inaccuracies in their measurements. Since these machines all contain such errors it is desirable to be able to compensate for or adjust that error out of the machine within reasonable tolerances.

The prior art in general is not capable of achieving this compensation and, therefore, the extreme accuracy often required in machinery of this type cannot be readily obtained. The normal arrangement in the first system described above between conductors on the scale and conductors on the slider is that they both are normally 90° to the longitudinal dimension of the scale or, in other words, to the axis of travel of the object. In the second or Moire Fringe system, the lines on the reader are disposed at an angle different from 90° while the scale lines are usually 90° to the path of movement. However, while these arrangements produce reasonable accuracy, it does not make it possible to compensate for variations or errors in the machine or scale itself.

BRIEF DESCRIPTION OF THE INVENTION

It has been discovered, therefore, that if the lines or conductors on both the scale and the reader or slider are slanted with respect to the path of movement of the scale, that it is possible to operate the optical or electrical measuring systems conventionally but it is also possible to compensate for error in the scale or machine geometry.

It has been found that it is advantageous to slant both sets of lines in the Moire Fringe system rather than having one slanted and one 90° to the path of travel as is conventional. The advantage achieved is that by moving the scale sideways or transversely to the path of travel the actual effective length of the intersecting point of the angular lines on the scale and the angular lines on the slider will be altered.

The same principle is applicable when conductors are used and the conductors are disposed at an angle with respect to the path of the movement. This results in a change in the "count" or in the ultimate reading because, effectively, movement of the scale laterally results in linear movement of the conductors. In other words, it has been discovered that the count achieved in a given length of travel can be increased or decreased by the lateral movement of the scale.

It has been discovered that this can be simply and readily accomplished by a relatively simple releasable clamping apparatus making positive lateral adjustment of the scale possible so that the method of producing improved accuracy in the ultimate reading and measurement of the travel of the movable object can be easily and quickly accomplished.

Accordingly, production of an improved method and apparatus for improving the accuracy of optically or electrically activated position measuring apparatus becomes the principal object of this invention with other objects thereof becoming more apparent upon a reading of the following brief specification considered and interpreted in view of the accompanying drawings.

OF THE DRAWINGS

BRIEF DESCRIPTION OF THE PREFERRED EMBODIMENTS

Figure 1:
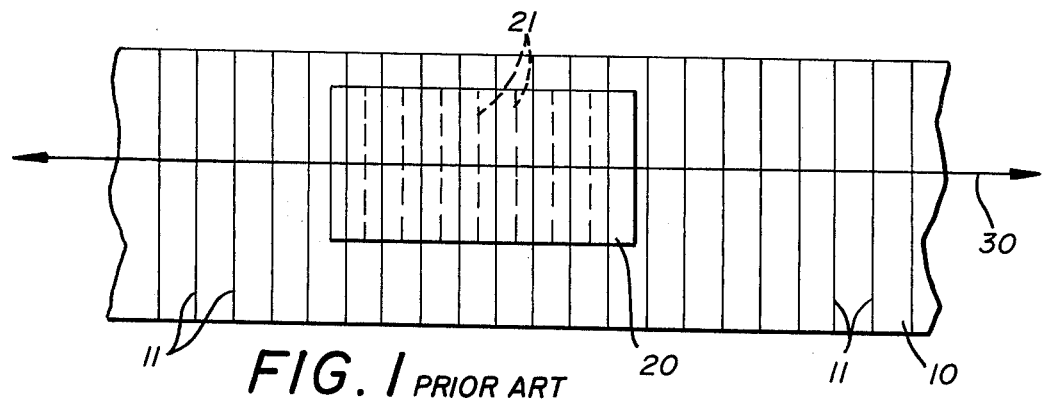
FIG. 1 is a schematic view showing the conductors in the slider and the scale of the inductive type superimposed upon each other in the normal fashion.

Before referring to the drawings it should be noted that Tripp U.S. Pat. No. 2,799,835 clearly discloses the concept of using the position measuring transformers and conductors referred to above.

Similarly the general concept of the Moire Fringe phenomenon is commonly known and is also discussed in Giambiasi U.S. Pat. No. 1,415,627. Therefore, no great detail with regard to the phenomenon itself will be presented herein.

It should be noted that while this application will often refer to "lines" the principles disclosed herein are equally applicable to "conductors".

Additionally, the various electronic or optical apparatus necessary for achieving the utilization of this phenomenon electrically or optically is well set forth in the various patents referred to earlier. Therefore, the drawings and the description of the drawings in this particular application with be in general terms only with it being understood that the electronic apparatus necessary to carry out the method of this application and adapt the apparatus of this application is well known to one with ordinary skill in this art having reference to United States patents just referred to.

Figure 2:
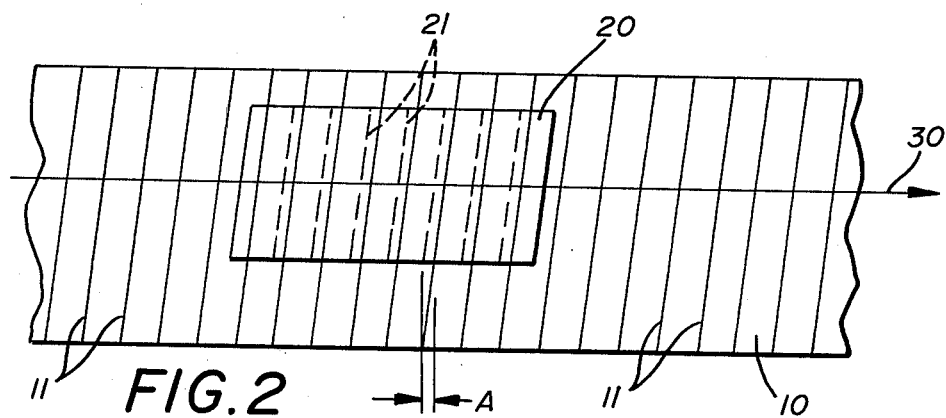
FIG. 2 is a view similar to FIG. 1 showing the position of the conductors on the slider and the scale after they have been disposed angularly.
Figure 3:
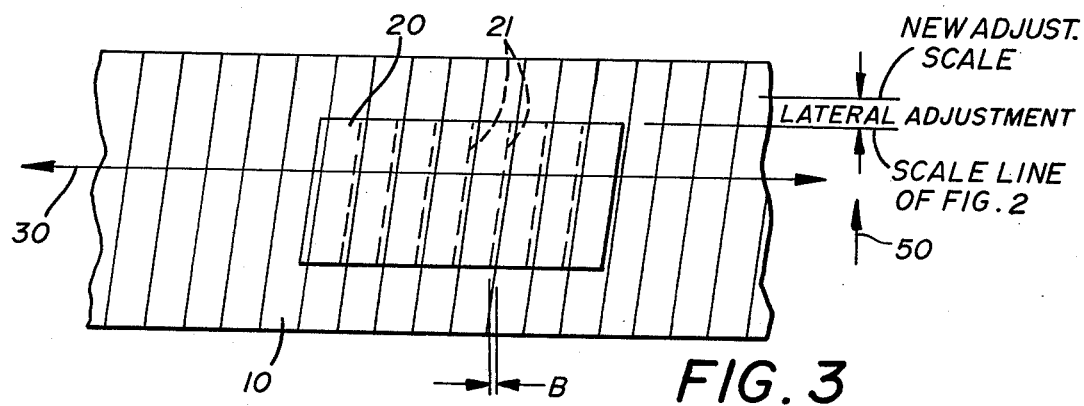
FIG. 3 is a view similar to FIG. 2 after lateral adjustment or transverse of the scale.

Turning then to the drawings, and particularly FIGS. 1 through 3 which essentially describe the electrical inductive system referred to in the introductory portion of this application, it will be noted that FIG. 1 is a schematic view showing the scale 10 and the slider 20. The scale 10 has a series of lines 11,11 intended to represent the conductors of this system of measurement while slider 20 has a series of broken lines 21,21 intended to schematically illustrate the conductors of the slider. In FIG. 1 these are disposed in their usual position or, in other words, at right angles to the path of movement designated by the arrow 30.

FIG. 2 shows how the conductors 11,11 of the scale 10 and 21,21 of slider 20 have been disposed at an angle with regard to the path of movement 30. This figure also shows how movement along the path of machine travel 30 can be measured as dimension A.

FIG. 3 shows how, when the scale 10 has been adjusted transversely of the path of movement 30 in the direction of the arrow 50 a different reading is achieved as designated by dimension B. This type of adjustment makes it possible to compensate for errors in the scale or machine geometry and will affect the reading engendered by movement of the slider 20 relatively of the scale 10 to thereby produce an accurate reading. In this way the linear count for a given linear movement is altered by the lateral adjustment. The conductors are shown as parallel in FIGS. 2-3 but the conductors of the slider may be positioned at an angle different from the scale as shown in FIGS. 4-5.

Figure 4:
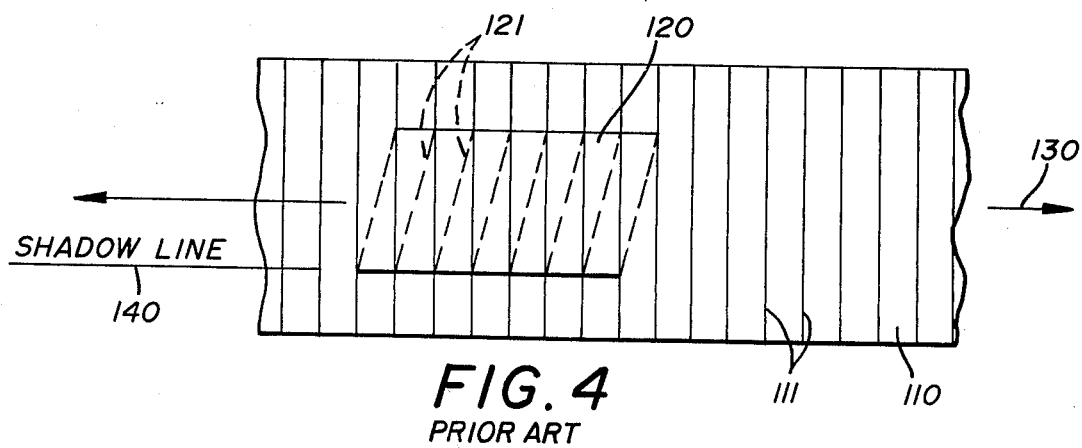
FIG. 4 is a schematic view showing the lines on the reader and the scale of the Moire Fringe system superimposed upon each other in normal fashion.
Figure 5:
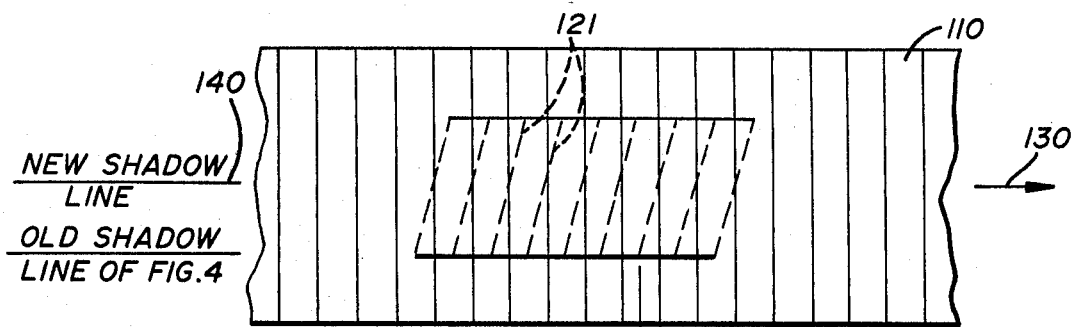
FIG. 5 is a view similar to FIG. 4 showing the position of the lines on the reader and the scale after the scale has been moved along the path of movement of the machine and showing the intersecting points or the points at which the shadow lines would occur.

Turning next then to FIGS. 4 and 5 of the drawings which relates to the Moire Fringe system, it will be noted that the scale, shown schematically and generally indicated by the numeral 110, has a plurality of parallel lines 111,111 which are disposed at 90° with respect to the path of movement or travel 130 of the machine. In practice, a common arrangement is 1000 lines per inch although this can be varied and is not critical to the principles of this invention.

The reader 120, which overlies the scale, also contains a pattern of parallel lines 121,121 which are disposed at an angle with respect to the path of movement 130. This is the normal Moire Fringe arrangement and movement in the direction 130 gives the linear measurement C.

It should also be noted here that for purposes of contrast the lines 121,121 have been shown as broken lines for purposes of illustration only. They would, of course, in practice, be solid lines just as the lines 111,111.

Figure 4A:
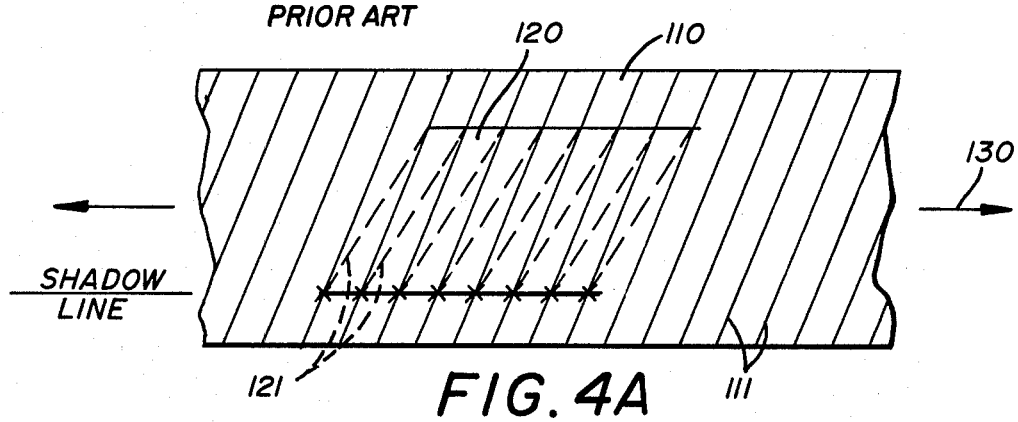
FIGS. 4A and 5A are views similar to FIGS. 4 and 5 showing a modified Moire Fringe arrangement with the lines on both the reader and the scale disposed at an angle other than 90° to the path of movement.

FIG. 4A shows a modified Moire Fringe arrangement wherein both scale and reader lines are disposed at an angle other than 90° to the path of movement 130.

Figure 5A:
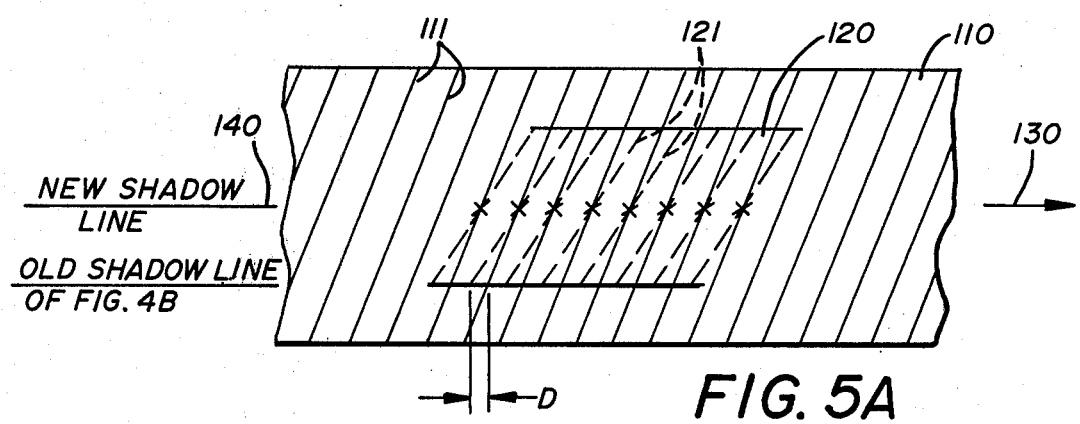

FIG. 5A of the drawings shows the reader lines and the scale lines after the scale has been moved in the direction of the arrow 130. At this point the "shadow lines" of the Moire Fringe effect appear at the intersection of lines 121,121 and 111,111 with this point of intersection being indicated by the numeral 140 in FIG. 5. This produces the "count" and is translatable into an actual measurement of the distance of linear travel indicated by the letter D.

Figure 6:
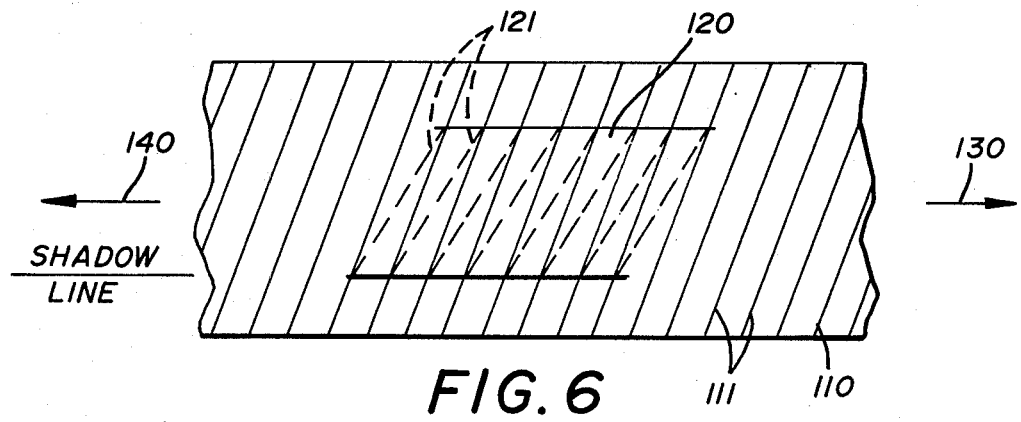
FIG. 6 is a view similar to FIG. 4A.

FIG. 6 is similar to FIGS. 4 and 5 and FIGS. 4A and 5A with FIG. 6 again showing the scale and the reader in their starting position and with both scale and reader lines at an angle other than 90° to the path of machine movement 130.

Figure 7:
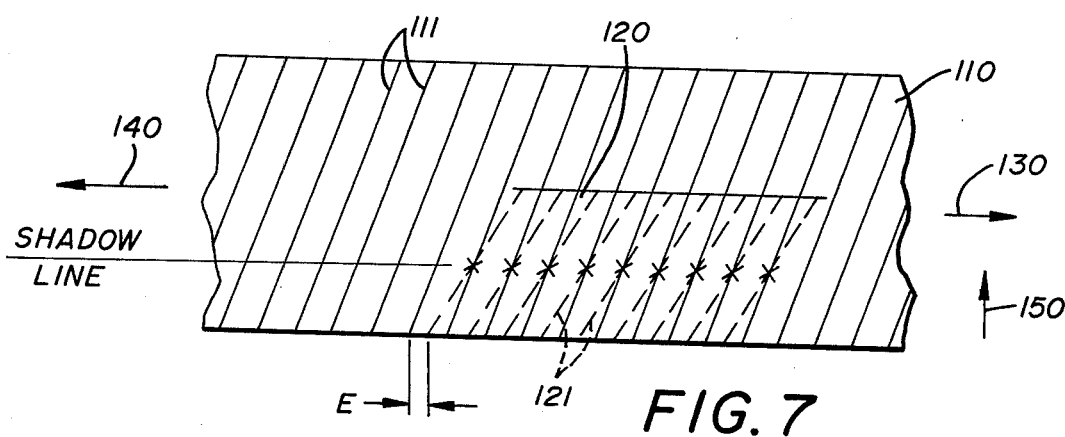
FIG. 7 is a view similar to FIG. 5A showing movement of the scale along the path of movement of the machine after the scale has been adjusted transversely to that direction and movement of the shadow line to achieve the new count.

FIG. 7, however, shows that the scale 110 has been moved laterally or transversely to the direction of the arrow 130 in the direction of arrow 150 so that the new count is indicated by the letter E. Once that has been accomplished and adjustment has been made by the apparatus which will be described below, the scale and the machine is then moved in the direction of the arrow 130 again causing the shadow lines to appear at the intersection of the scale and slider or reader lines. Again this is indicated by the numeral 140, but at this time the count will have been changed due to the movement of the scale in the direction of the arrow 150 so that the new count is indicated by the letter E. The count can either be increased or decreased depending upon the direction of scale adjustment.

This permits geometry errors in the machine or the scale itself to be compensated for and insures reasonably accurate measurement and operation of the machine.

By way of example, with 1000 lines per inch and the scale lines slanted 10° a lateral movement of 0.010 inches results in a count change of 0.00176 and a movement of 0.002 inches results in a count change of 0.00035. The amount of movement would naturally depend on the machine geometry error involved and it is believed that the scale can be adjusted to read within 0.0001 inches measured in 3 inch intervals so that the total error over 50 inches of travel would still be within 0.0001 inches.

By way of further example, if there were a scale error of 0.0005 inches over 50 inches of travel and a machine error of 0.0005 inches the result could be an error of 0.001 inches. With the adjustment possible with this invention that error would become 0.0001 inches.

Figure 9:
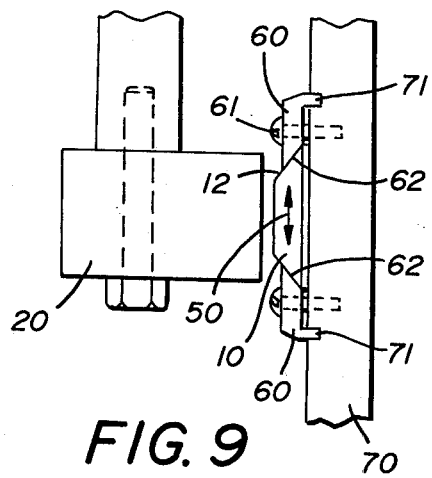
FIG. 9 is a partial sectional elevation showing the scale and reader of FIG. 8 and one means for transverse adjustment of the scale.
Figure 8:
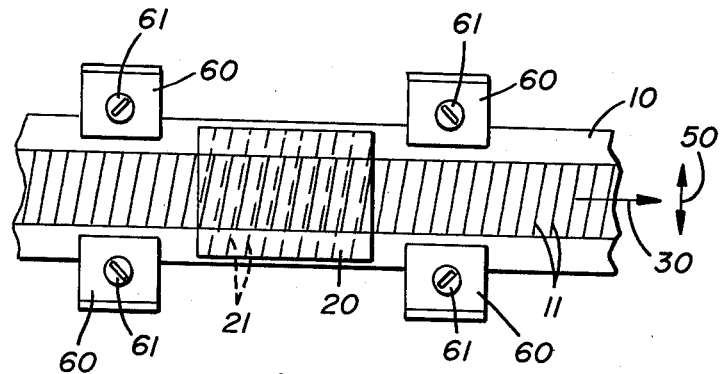
FIG. 8 is a partial plan view of the inductive scale and slider of the inductive system with the conductors shown schematically and modified in accordance with the teachings of this invention.

Referring to FIGS. 8 and 9, for example, one apparatus for accomplishing this method with the inductive system is illustrated.

In that illustration the scale 10 is illustrated as being a flat elongate member having a plurality of parallel lines 11,11 on its surface. These lines schematically represent the conductors.

The reader 20 has lines 21,21 which also schematically represent conductors.

The scale 10 is held in place on the machine 70 by means of the adjustment clips 60,60 which are secured to the machine by means of the screws 61,61.

In this particular embodiment the clips 60,60 are L-shaped in cross section with one leg received in recesses 71,71 of the machine itself. These clips also have tapered surfaces 62,62 and the scale has complemental tapered edge surfaces 12,12 so that by loosening one clip and tightening the other the scale can be cammed in the direction of the arrow 50 to accomplish the adjustment step.

Figure 11:
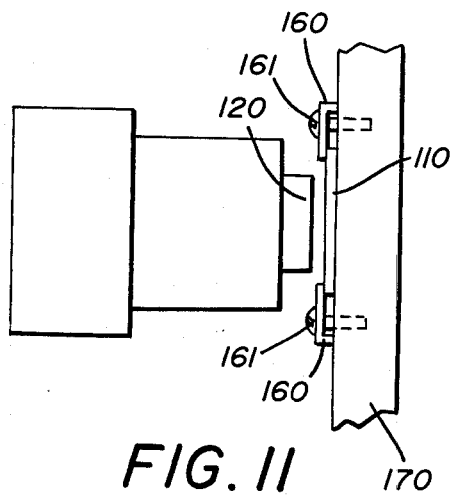
FIG. 11 is a partial sectional elevation showing the scale and slider of FIG. 10 and one means for transverse adjustment.
Figure 10:
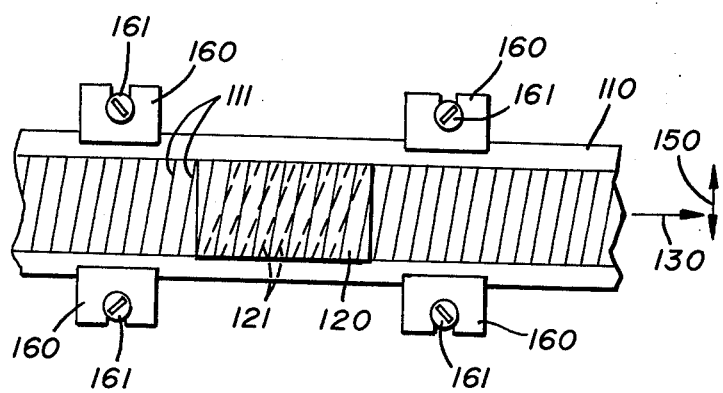
FIG. 10 is a partial plan view of the Moire Fringe system modified in accordance with the teachings of this invention.

Turning next then to FIGS. 10 and 11, a Moire Fringe system modified in accordance with the teachings is illustrated with lines 111 and 121 representing the usual lines on scale 110 and slider 120.

The scale 110 is held in place on the movable part of the machine 170 by adjustment clips 160,160 which overlie the transverse edges of the scale 110 and are secured adjustably and releasably to the machine 170 by means of screws 161,161. The reader 120 is superimposed over the scale and it will be readily apparent that by simply loosening the screws 161,161 the scale can be moved laterally or transversely to the line of travel 130 in the direction of the arrow 150. The screws can then be retightened and the compensating adjustment by the machine will have taken place. Following this, of course, normal movement and operation of the machine in the direction of the arrow 130 will provide the corrected "count" of FIG. 7 and ultimately the corrected reading.

It will be noted that FIGS. 8 and 9 show one mechanical arrangement for controlling the transverse adjustment while FIGS. 10 and 11 show another. These can be used interchangeably on the two systems.

While a full and complete description of the invention has been set forth in accordance with the dictates of the Patent Statutes, it should be understood that modifications can be resorted to without departing from the spirit hereof or the scope of the appended claims.

Thus the measuring apparatus is not intended to be limited to inspection machines, which have been referred to herein by way of example, but could be employed in any linear system where the extent of movement of an object relatively of a reference structure is to be measured.

What is claimed is:

1. In a method of measuring movement wherein primary and secondary windings comprising a multiplicity of series-connected conductors are respectively disposed on a movable and a fixed object and one of said windings is energized to produce a secondary voltage varying in magnitude according to the relative position of the objects, the improvement comprising:
   (A) disposing said conductors at an angle other than 90° with respect to the path of movement; and
   (B) adjusting the magnitude of the secondary voltage by displacing said conductors on the movable object transversely of the path of movement of the movable object a fixed distance to increase or decrease the linear count for a given linear movement.

2. In a method of measuring movement wherein a first series of parallel line patterns is disposed on a fixed member that is superimposed over a second series of line patterns disposed on a movable member and the Moire Fringe pattern created by relative movement of the line patterns is detected electrically, the improvement comprising:
   (A) disposing said line patterns at an angle other than the 90° with respect to the path of movement of the movable member; and
   (B) adjusting said line pattern of the movable member transversely of the path of movement of the movable member a fixed distance to increase or decrease the linear count for a given linear movement of the fringe pattern to compensate for machine and scale error.

3. The method of claim 2 wherein each of said line patterns are disposed at different angles with respect to the direction of movement.

4. In a system for measuring linear movement including primary and secondary windings comprising a multiplicity of series-connected conductors respectively disposed on the scale of a movable object and on a fixed object wherein one of said windings is energized to produce a secondary voltage varying in magnitude according to the relative position of the objects, the improvement wherein:

(A) the conductors on the fixed object are disposed at an angle with respect to the path of movement;

(B) the conductors of the movable object are positioned at an angle with respect to the path of movement and different from those on the fixed object; and (C) means for adjusting a scale transversely of the path of movement a fixed distance to increase or decrease the linear count for a given linear movement.

5. In a system for measuring linear movement including a scale having a periodic pattern of parallel lines and a superimposed slider having a similar pattern of parallel lines and means for electronically detecting the Moire Fringe produced by relative movement of the scale and the slider, the improvement wherein:

(A) the lines of the scale are disposed at an angle with respect to the path of movement;

(B) the lines of the superimposed slider are disposed at angle with respect to the path of movement and different from those on the scale; and (C) means for adjusting the scale transversely of the path of movement of the movable member a fixed distance to increase or decrease the linear count for a given linear movement.

6. The system of claim 4 or 5 wherein said means for adjusting the scale include a plurality of clips releasably secured to the movable object and releasably engaging the scale whereby said scale may be moved transversely of the path of movement.

7. The system of claim 6 wherein (A) said movable object has a plurality of recesses in one surface thereof;

(B) said clips being L-shaped in cross-section and having one leg received in said recesses;

(C) the remaining leg of said clips terminating in tapered surface;

(D) said scale has its transverse edges complementally tapered for engagement with said tapered surface of said clip whereby loosening of one clip and tightening of the other will force said scale to move in a direction transverse to the path of movement of said movable member.

* * * * *